Feb. 13, 1940.               A. F. MOYER                2,190,161
           BALANCED MECHANISM FOR CONVERTING ROTARY IN
              RECIPROCATORY MOTIONS AND VICE VERSA
                    Filed May 20, 1937         6 Sheets-Sheet 1
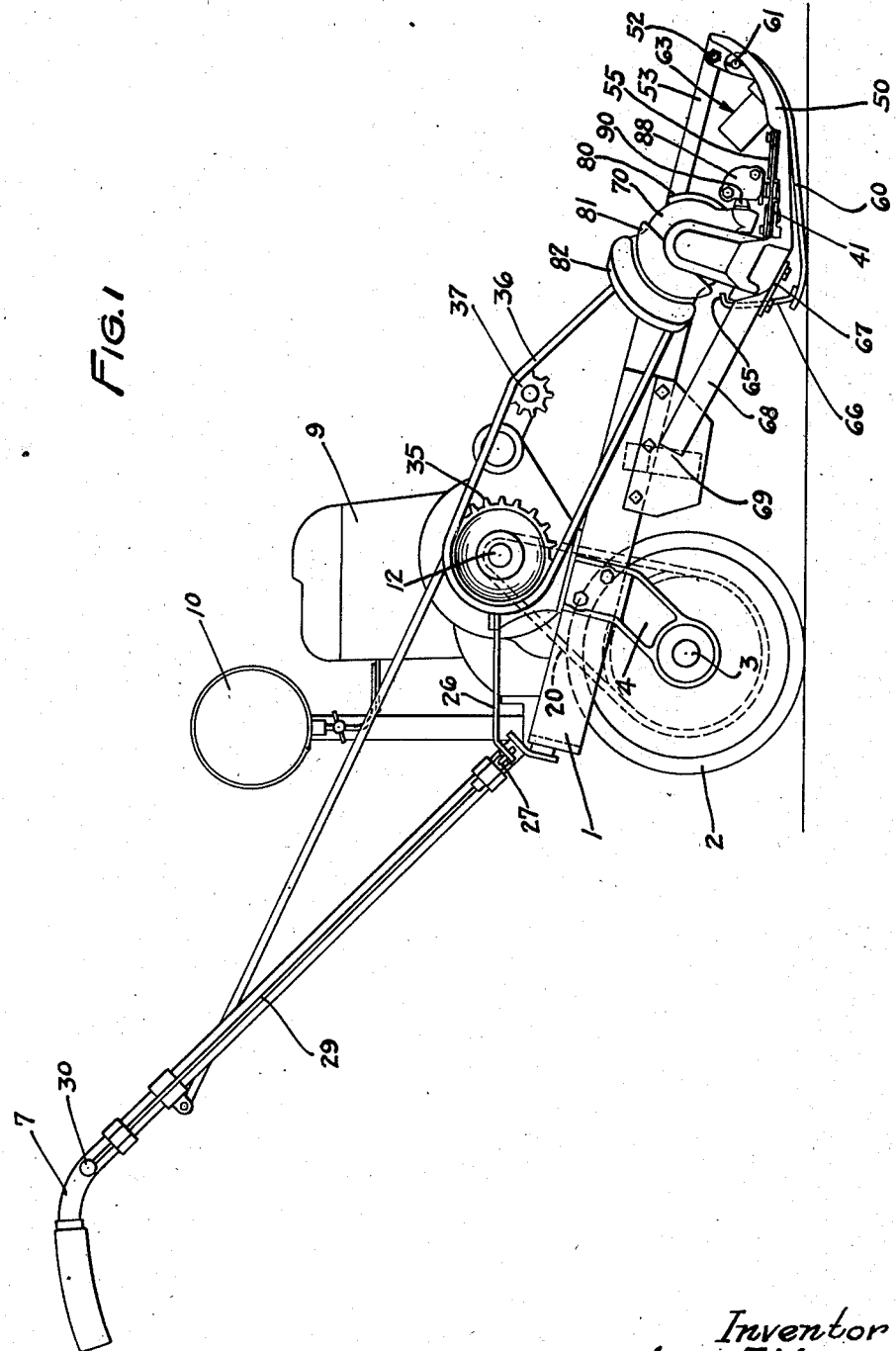
Inventor
AMOS F. MOYER
By
ATTORNEYS

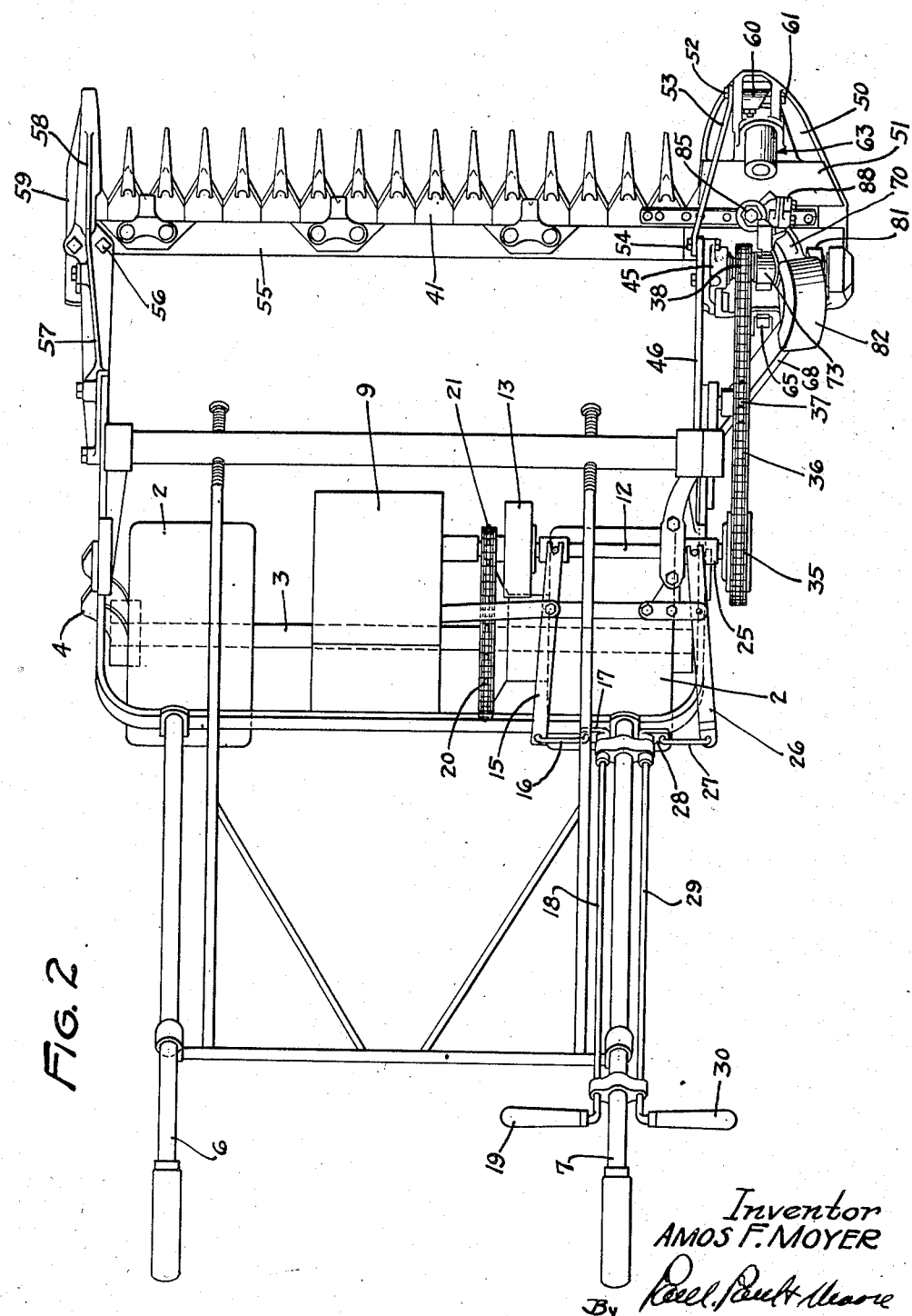

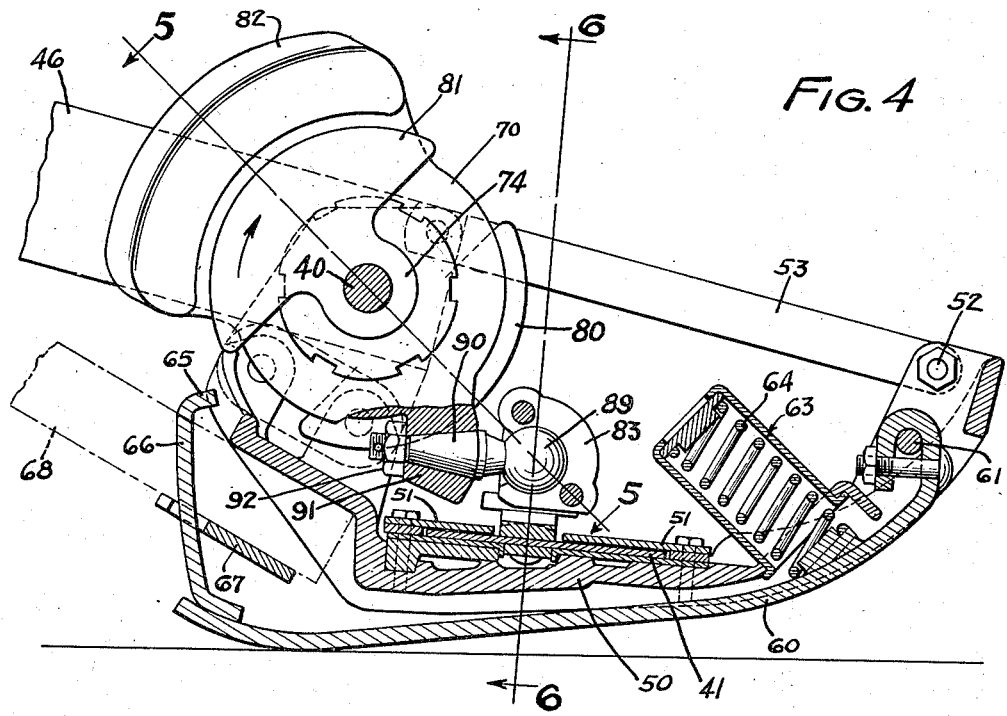
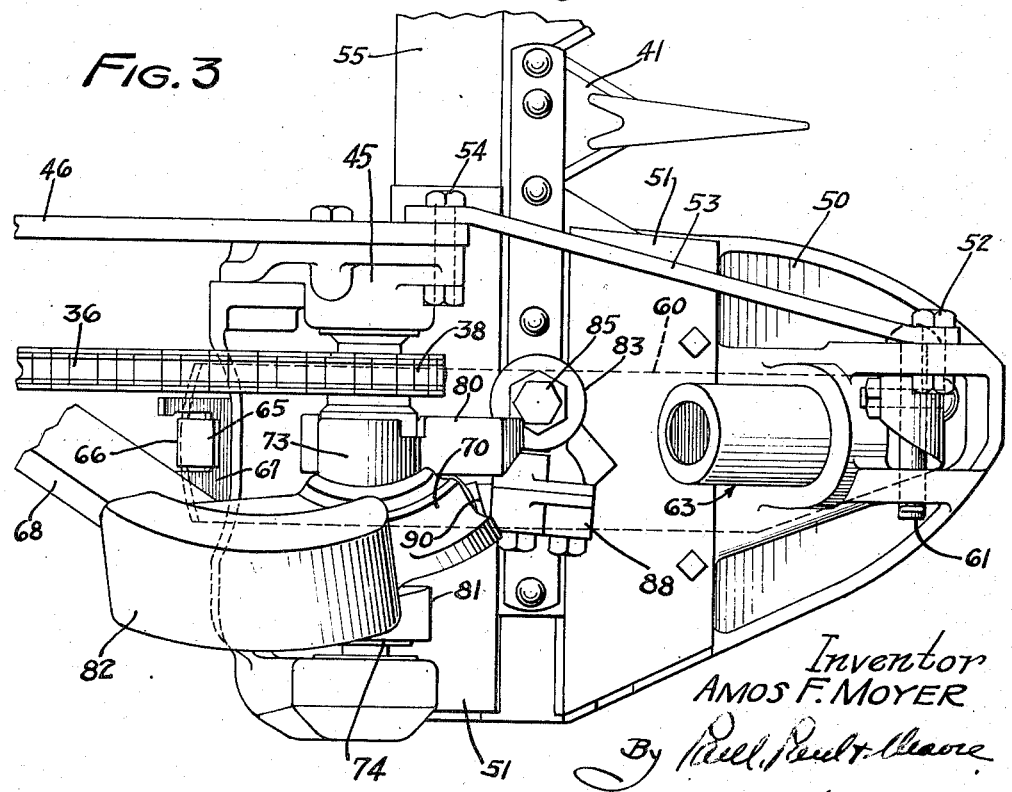

Feb. 13, 1940.      A. F. MOYER      2,190,161
BALANCED MECHANISM FOR CONVERTING ROTARY IN
RECIPROCATORY MOTIONS AND VICE VERSA
Filed May 20, 1937     6 Sheets-Sheet 4

Inventor
AMOS F. MOYER
By Paul Parrett Moore
ATTORNEYS

Feb. 13, 1940.    A. F. MOYER    2,190,161
BALANCED MECHANISM FOR CONVERTING ROTARY IN
RECIPROCATORY MOTIONS AND VICE VERSA
Filed May 20, 1937    6 Sheets-Sheet 5

Inventor
AMOS F. MOYER
By [signature]
ATTORNEYS

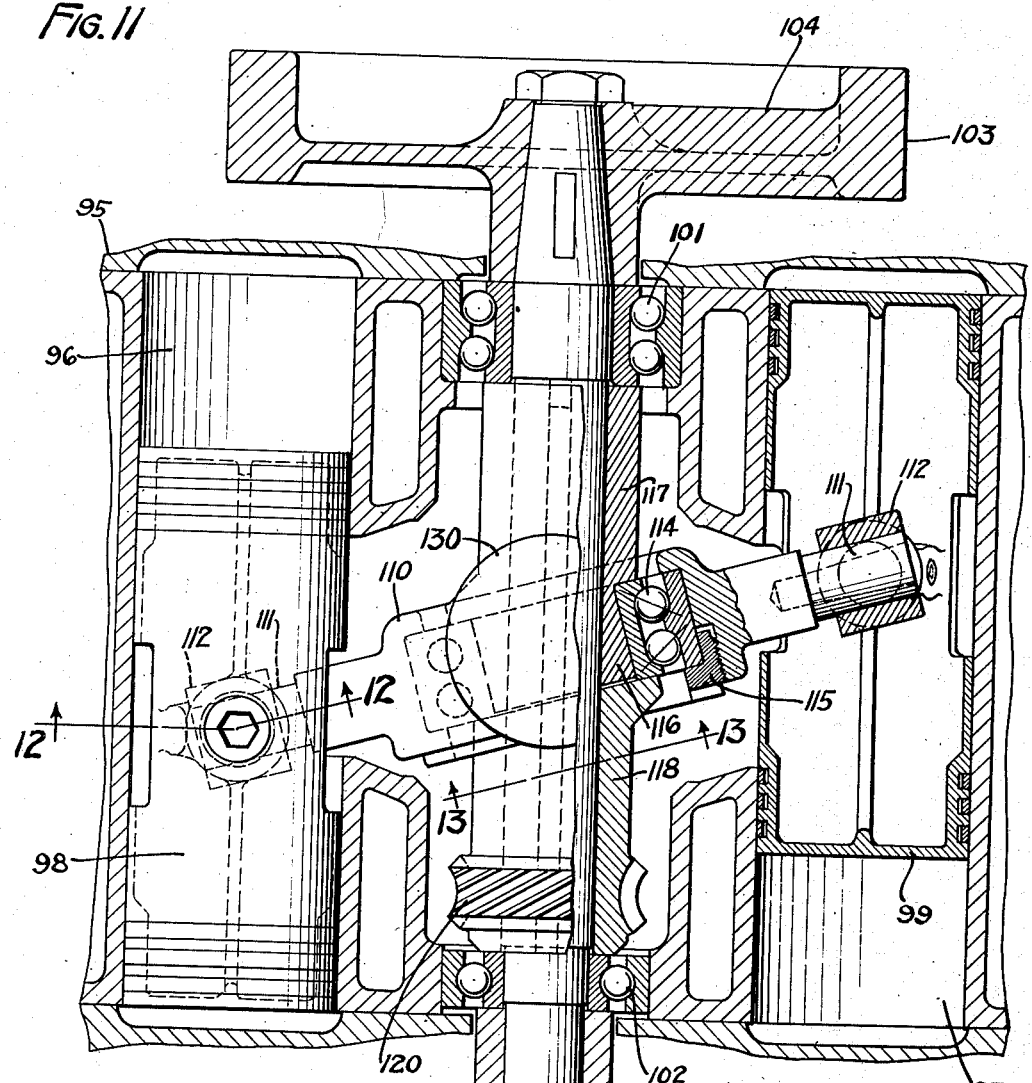
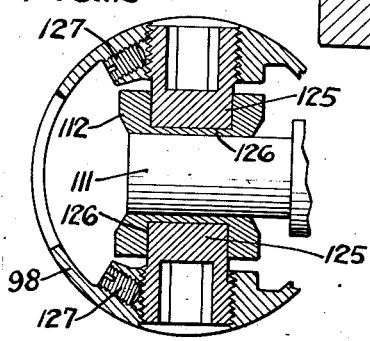
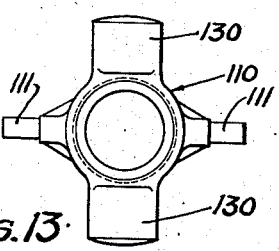

Patented Feb. 13, 1940

2,190,161

UNITED STATES PATENT OFFICE 2,190,161

BALANCED MECHANISM FOR CONVERTING ROTARY IN RECIPROCATORY MOTIONS AND VICE VERSA

Amos F. Moyer, Minneapolis, Minn., assignor to Toro Manufacturing Corporation of Minnesota, Minneapolis, Minn., a corporation of Minnesota Application May 20, 1937, Serial No. 143,777

22 Claims. (Cl. 56—262)

This invention relates primarily to means for converting rotary into reciprocatory motion, of a part having an appreciable weight and without producing appreciable vibration. A valuable application of the invention, which is claimed herein along with the broader idea of means, is in sickles, such as are used for cutting grain or grasses. It is desirable to reciprocate the knife bars of these sickles at relatively high speeds but when so operated excessive and deleterious vibration results and thus, in all mechanism of this kind known to me, operation at a lower speed is necessary to avoid such vibration. This is a serious handicap to speed operation, and it is an object of this invention to make possible high speed operation without excessive vibration.

Grass cutting sickles are normally required to operate at such a rate, proportionate to traveling speed, that the machine does not advance over the ground a distance appreciably greater than the depth of the cutting edges of the sickle knives, as measured in direction of travel, during the interval required to stroke each sickle knife across the space between the adjacent stationary guard knives. With the advent of motor driven and tractor driven mowing implements and the desire for increased traveling speeds (with obvious advantages) sickles are now required to reciprocate at higher speeds, and the resultant vibration has become increasingly serious. In fact, the present known means for reciprocating sickles, produce such excessive vibration as to necessitate the operation of the machines at much slower speeds than they are otherwise adapted for, particularly when equipped with pneumatic tires.

Objects of this invention therefore are: first, to provide means whereby rotary motion is converted into reciprocatory motion, or vice versa, with a minimum of vibration of the operating parts, and second to specifically apply the principle of such operation in a mowing implement of the sickle type, whereby to so reduce vibratory effects that the sickles can be operated at substantially greater speeds than heretofore, without detrimental effects on the mechanisms concerned in their operation.

Other objects are to provide means for approximately equalizing the weight carried at the two ends of the sickle, irrespective of ordinary ground undulations, when the sickle is held parallel to the axle of a two-wheeled propelling vehicle, without relative transverse oscillation. A feature is the novel relationship between a double row ball bearing of specific type, and the character of the forces by which it is loaded. Thus it is an object of the invention to provide, broadly, a movement for converting rotary to reciprocatory motions for application wherever such a movement is desirable, as for example, in an internal combustion engine or compressor.

It is specifically an object to provide an internal combustion engine of the reciprocatory type utilizing a movement of the type herein set forth for converting the reciprocatory motion to rotary motion.

Features of the invention include all details of construction shown in the drawings or described in the specification, along with the broader ideas of means inherent in the disclosure.

Features, objects and advantages will appear in the description of the drawings, and in said drawings, Figure 1 is a side elevation of a mowing implement illustrating one application of the principle of the invention;

Figure 2 is a plan view of Figure 1 showing the mechanism at one of its extreme positions;

Figure 3 is a detail plan of my balanced cutter driving mechanism with the parts positioned as in Figure 2;

Figure 4 is a vertical section on line 4—4 of Figure 6;

Figure 11 is a plan section, showing my invention applied to an engine;

Figure 12 is a vertical section on line 12—12 of Figure 11; and

Figure 13 is an elevation of the yoke or connection viewed from line 13—13 of Figure 11.

Figure 5:
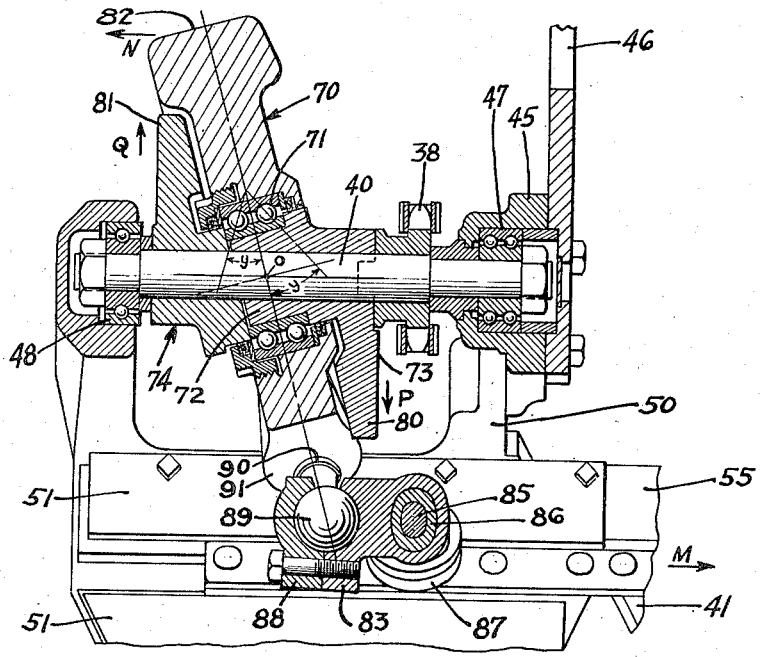
Figure 5 is a section taken on line 5—5 of Figure 4.

In the drawings, see Figure 1, numeral 1 generally indicates a frame having rolling means 2 supporting the same, said means being constituted in this instance by a pair of drums or optionally pneumatic tires on and driven by a cross shaft 3, the shaft being held by suitable brackets 4 on the side of the frame. Attached to the rear of the frame is a steering means such as handles 6, 7, suitably secured and braced. Mounted upon the frame is an engine diagrammatically indicated at 9 supplied by a fuel tank 10, (Figure 1) the engine drives a shaft 12 on which is mounted clutch 13, see Figure 2. The clutch is controlled by suitable mechanisms including a lever 15, a link 16, and arm 17 upon a shaft 18, which shaft is mounted on the right hand steering handle 7, the outer end of the shaft being provided with a control handle 19. The shaft 3 is driven from the engine through sprocket chain 20 from shaft 21 whereby the drums or rolling means 2 are rotated to advance the machine. A second clutch 25 operated by lever 26, link 27, arm 28, shaft 29 and handle 30, controls the drive between shaft 12 and a sprocket wheel 35 arranged at one side and laterally of the machine. The sprocket 35 has a chain 36 passing over an idler 37 and over a second sprocket 38 on shaft 40, see Figures 3 and 5.

The cutter mechanism is arranged forwardly of the rolling means, and is constituted by a sickle which has the reciprocating knife bar 41. The construction of the sickle per se, is not part of this invention but its reciprocable knife bar is claimed in combination. The bar is made to reciprocate very rapidly, but with a minimum of vibration. The driving means for the cutter includes parts which are arranged at one side of the frame, and adjacent one end of the bar 41.

Figure 6:
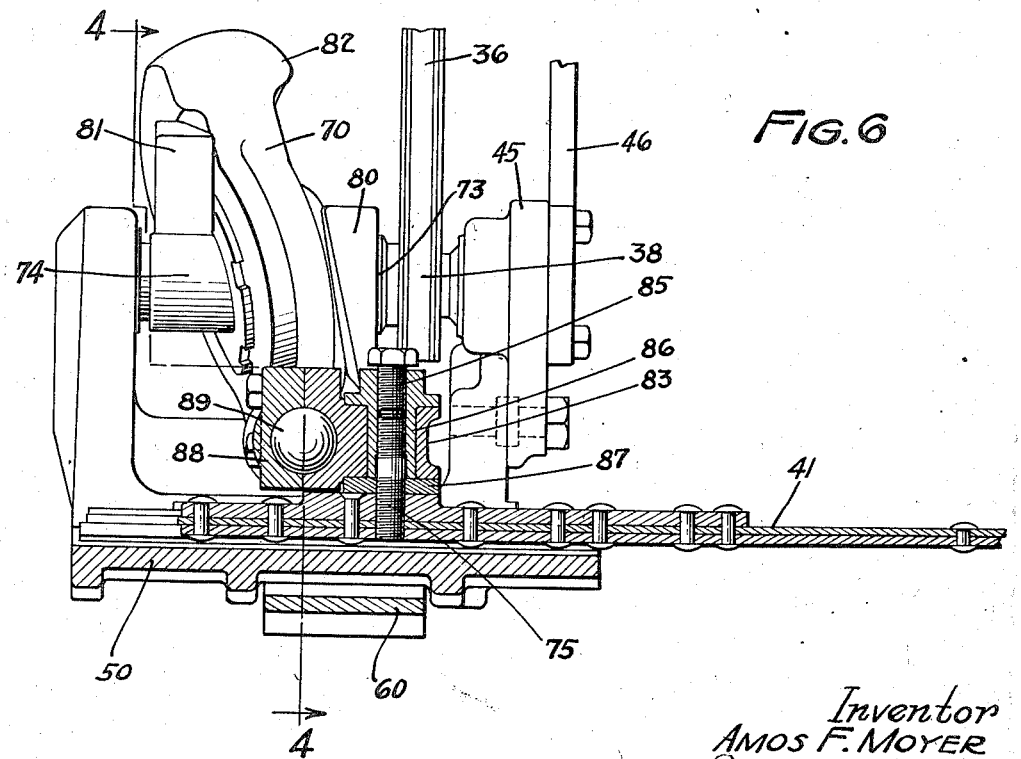
Figure 6 is a vertical section on line 6—6 of Figure 4.

The shaft 40 and the mechanism immediately associated therewith is mounted on what may be termed an outboard bracket 45, see Figure 6, suitably bolted to one of the side frame members 46. This bracket is preferably a casting and provides a bearing 47 for the inner end of the shaft, and a bearing 48 for the outer end. The bracket includes the horizontal portion 50, see Figures 4 and 6, upon which is guide means 51 for the reciprocating knife bar 41. The outermost part of the horizontal portion 50 has connected thereto as at 52 a brace 53, which in turn is connected as at 54 to the side element 46 of the frame. The bed plate for the sickle is indicated at 55, see Figure 2, and it is connected as at 56 to the opposite side 57 of the frame, and the frame has a horizontal extension 58 below which is a ground-engaging shoe 59. The usual knife bar guides are provided on the bed plate 55.

Arranged beneath the part 50 is a ground-engaging shoe 60 which in its relation to the cutter and its operating mechanism is one of the features of this invention. This shoe underlies the balanced reciprocating mechanism, of this invention, and is pivoted as at 61 to the outermost part of 50, see Figure 4, and extends rearwardly and is free to swing vertically. Cushioning means generally indicated at 63 is provided including a spring 64 acting to urge the shoe toward the ground and away from part 50. Downward movement of the shoe is limited by the stop 65 on the upper end of the arm 66. The stop is engageable with plate 67 attached to brace 68 (see Figure 1) in turn attached to the side of the frame as at 69.

By the above described means, the weight of the sickle and its driving mechanism together with the front portion of the machine as a whole, rests upon the two ground shoes 59 and 60, and the spring 64 exerts such a pressure as to support an amount of weight on shoe 60 approximately equal to the remaining weight that rests on shoe 59. The cushion action of the spring 64, combined with pivotal movement of shoe 60 permits this relationship to remain approximate, notwithstanding undulations in the ground and notwithstanding the fact that the sickle driving means constitutes a considerable aggregation of weight at one front corner of the machine, as a whole. This permits a proper equalization of traction effort on drums 2 through differential gearing (not shown) but generally designated 23 in Figure 2.

The main feature of this invention relates to the balancing mechanism now to be described in detail. Referring first particularly to Figures 4, 5 and 6. In Figure 5 there is shown mounted on the shaft 40, which is the drive shaft, a non-revolving wobble yoke 70 through which the shaft passes and which is arranged at an angle to the rotative axis of the shaft as shown. This yoke is mounted by means of bearings 71, upon an inclined hub 72 of a weighted balancing member 73. This member rotates with the shaft and independently of the yoke, which yoke does not rotate, but is made to wobble and to reciprocate the knife bar.

A second weighted balancing member rotatable with the shaft is indicated at 74, and the members 73 and 74 act in conjunction with weighted means or portions of the yoke to obtain the balance contemplated herein.

The members 73 and 74, which can be cast, are suitably weighted by means indicated by numerals 80 and 81. This means is herein shown as similarly shaped enlargements, see Figures 4 and 5, arranged with point symmetry at opposite sides of the yoke center line and at opposite sides of the axis of rotation of the shaft 40, the point of symmetry lying at the intersection of the axis of the inclined bearing with the center of shaft 40.

Referring to Figures 4, 5 and 6, the yoke is connected to the reciprocable knife bar 41 by means of a ball and socket joint, the socket part 83 of which, see Figure 6, is attached by means of a threaded stud 75 secured in the sickle bar and passing into and securing a sleeve 86 about which the socket 83 swings. A wear washer 87 is interposed as shown, and the sleeve is locked in position by screw 85. At the outer side of the element 83, the closure plate for the ball socket is indicated at 88. The ball is indicated at 89 and is connected to the yoke 70 by a cone shaped extension 90 passing through a lug 91 of the yoke, this extension being held by means of nut 92, see Figure 4. By these means, the sickle can be removed from the mower after loosening screw 85, unscrewing the sleeve 86 from the stud 75, and swinging the yoke backward to lift the ball and socket member. The stud, riveted securely into the sickle bar provides ample strength in operation.

In Figure 5 the wobble yoke 70 is seen to be mounted by bearing 71 upon the inclined hub 72. Ball 89, as described, is mounted on the yoke, and at the diametrically opposite side therefrom is the enlarged weight 82, here shown as an integral part of yoke 70. As shown in Figure 4, the weight 82 is considerably extended laterally of the line 5—5, and the general shape of the yoke and ball assembly approximates symmetry about line 5—5. More explicitly, the weight at one side of this line would substantially balance the weight at the other side, if the line 5—5 were taken as a pivot axis. As will be herein shown, certain design considerations may render desirable the greater extension of weight 82 laterally of line 5—5. Also the weight 82 acting through its lever arm from the center of shaft 40, balances the reciprocating parts and connecting members about a pivot taken through the center of shaft 40 and perpendicular to line 5—5.

In this embodiment the positions of the parts in Figures 4 and 5 correspond to one extreme of reciprocatory motion of the knife or bar, the opposite extreme of motion of which occurs when the member 80 moves to that position above the shaft, which is diametrically opposite to its position in the figure. The member 70 will then be oppositely inclined and the ball 89 will be at the outer end of its stroke.

The elements are so arranged and designed that the yoke wobbles but does not rotate and the yoke motion is imparted to the knife bar by ball 89. Only such weight has been applied on that side of the yoke where connection is made with the reciprocating cutter bar as is necessary for mechanical strength. When the weight on the opposite side of the bearing center line has a magnitude and a length of lever arm sufficient to counter-balance the reciprocating member together with its connection and adjacent part of the yoke, the linear vibration normally due to the motion of the reciprocating member is absorbed and converted into a non-revolving and alternately reversing force-couple.

Although such a force-couple will normally produce less vibration than a single alternating force, such as that due to the motion of the sickle bar alone, the combination of moving weights here shown serves to absorb a considerable portion of the force-couple itself.

This may be visualized by reference to Figure 5, where the direction of the inertia acting on sickle bar 41 is shown by the adjacent arrow M, while the force acting on weight 82 is according to the oppositely directed arrow N. The combination is the above mentioned force-couple which acts in an anti-clockwise direction about the center O. Opposed to this force couple are the centrifugal forces acting in weights 80 and 81. As indicated by the respectively adjacent arrows P, Q, their forces constitute a couple acting in a clockwise direction about the center O, and the net result will be only the difference between the two force couples, which is very much smaller than the first force-couple alone.

This principle of opposing one force couple that is set up by the wobbling or wobbling and reciprocating motions against another force couple that is set up by centrifugal forces in the revolving parts, can be carried out to the extent of obtaining complete dynamic balance, as illustrated by the following:

Figures 7, 8, 9 and 10 show in diagrammatic perspective, the motions that take place and the resulting forces that arise, in a non-revolving body mounted and actuated as herein contemplated. AA represents the principal axis of rotation corresponding to the shaft and herein called the A axis and which is assumed to lie in a horizontal plane. BB is the axis of the inclined bearing herein called the B axis, that revolves or gyrates with a constant angle of inclination about the A axis. The dotted circles having respective radii $ab$ and $a'b'$ are the paths in which selected points $b$ and $b'$ on the B axis revolve about points $a$ and $a'$ on the A axis. In the figures, successive positions of $ab$ and $a'b'$ are shown at ninety degree intervals and represent the revolving or gyrating motions of the B axis, during one revolution.

Figure 7:
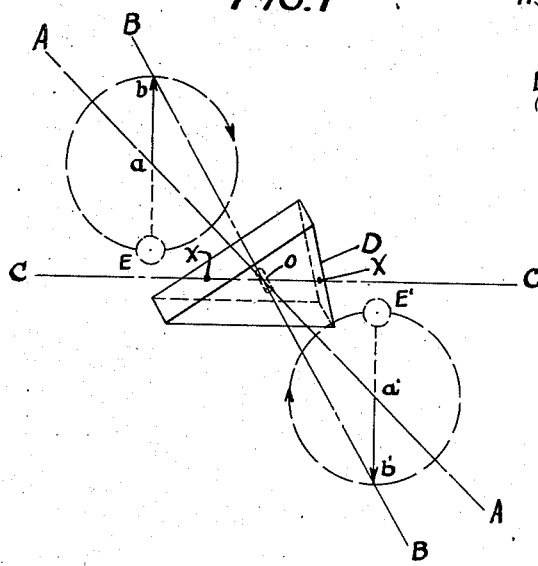
Figures 7, 8, 9 and 10 are diagrammatic perspective views illustrating the broad principle of my invention.

For the purpose of illustration, there is shown a triangular prismatic body D (which may actually have any desired shape) which may be like the yoke, and having a suitable bearing or bearings on the B axis. Although the body D does not revolve, it is constrained by its bearings to follow the gyratory motions of the B axis, producing a motion of the body commonly referred to as a wobble. In Figure 7, $b$ is vertically above $a$, and $b'$ vertically below $a'$, and accordingly the top corner of body D is tipped forwardly in the vertical plane containing the A axis. That is, the body D is tipped forwardly about a line CC', which may be called the axis of wobble and which pierces the surfaces of the body at points X. This axis of wobble will be seen to lie perpendicularly to both the A axis and the B axis and to pass through their common point of intersection O. Axis CC' is therefore horizontal in Figure 1, and may be conceived as having direction from left to right, and such a conception will assist in the comprehension of the following description.

Figure 8:
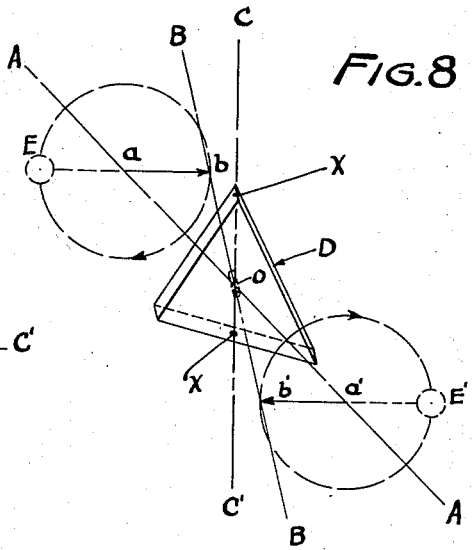
Figure 9:
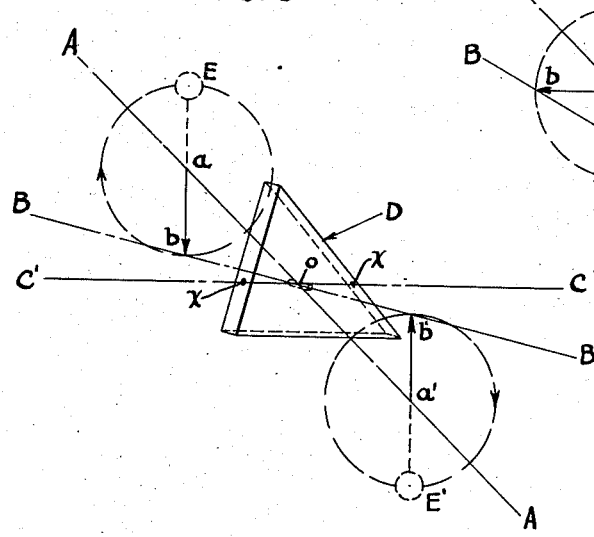
Figure 10:
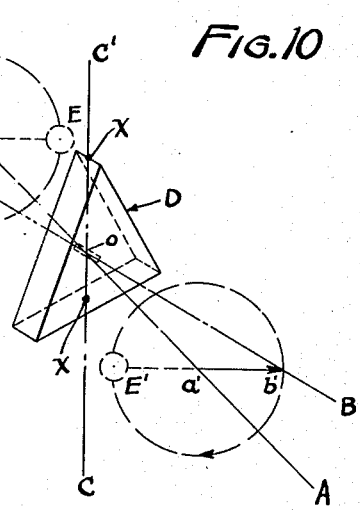

In Figures 8, 9 and 10 the respective directions of $ab$ are horizontally to the right, vertically downward, and horizontally to the left. In each figure, $a'b'$ is exactly opposite to $ab$. In Figure 8, the body D has the right edge inclined forwardly in a horizontal plane; in Figure 9, the top is inclined backwardly in a vertical plane; and in Figure 10, the left side is inclined forwardly in a horizontal plane. The corresponding directions of the axis of wobble CC' are vertically downward in Figure 8, horizontally from right to left in Figure 9, and vertically upward in Figure 10. From this, it will be seen that the axis of wobble revolves in a radial plane about the A axis, which it must do in order to remain perpendicular to the B axis while the latter revolves or gyrates.

The center of gravity of body D is assumed to lie at the intersection O of the A and B axes, and by construction, the angle of inclination of the body D (about the axis of wobble) away from a plane containing point O and radial to the A axis, is equal to the angle between the A and B axes. As referred to a fixed plane containing the A axis, for example the vertical plane, the inclination of the body D is seen to be at its maximum forwardly in Figure 7, to be zero in Figure 8, to be at its maximum backward in Figure 9, to be zero in Figure 10, and to return to maximum inclination forward as in Figure 8 with the completion of one full revolution.

The motion intercepted in this manner on the vertical reference plane (assuming body D to be held against rotation by a point thereon displaced in the vertical plane from intersection O) is simple harmonic motion producing inertia forces proportionate to displacement and generating a rocking couple that reaches a maximum forwardly in the position of Figure 7, and a maximum backwardly in the position of Figure 9. These oppositely directed maxima, occurring at one hundred eighty degree intervals, are represented as force couples by the pairs of lines $ab$ and $a'b'$ in the respective figures. Similarly, employing a horizontal reference plane, Figures 8 and 10 are seen to represent maxima of force couples that act clockwise in Figure 8 and anti-clockwise in Figure 10. These also correspond (at least for the four positions illustrated in Figures 7, 8, 9 and 10) to simple harmonic motion as referred to the horizontal plane, and the two Figures 8 and 10 show phases displaced from each other by an arc of one hundred eighty degrees.

If the body D is guided or held against rotation, by a point that is displaced in a given plane such as the vertical reference plane, a second point, selected on the body displaced ninety degrees therefrom about intersection O, will be in the horizontal reference plane only at each of the four positions illustrated, because such a point actually moves in a path resembling an elongated figure 8. The exact motion of the body is, however, such that its inertia with respect to a fixed plane at right angles to the plane of the guiding point is substantially if not exactly equal to the inertia that accompanies harmonic motion.

The inertia effects of these two simple harmonic motions, as referred to planes at right angles with each other, are but separate components of the inertia effects produced in the body D, as the axis of wobble CC', revolves about the A axis, in synchronism with, and at right angles to, the B axis. If the body is so shaped that its moment of inertia about a vertical axis, such as CC', in Figures 8 or 10, is equal to its moment of inertia about a horizontal axis, such as CC', in Figures 7 or 9, then the force couple acting about the axis of wobble CC' remains constant, and also revolves in synchronism together with the B axis and the axis of wobble. That is, if the lines ab and a'b', together with lever arm aa', represent the magnitude of oppositely directed force couples in Figures 7 and 9, then the corresponding lines will represent couples of the same magnitude in Figures 8 and 10. Under these conditions, complete dynamic balance can be obtained by applying suitably proportioned counterweights E and E' that also revolve synchronously with the B axis, in opposed positions, so that E is opposite to b, and E' opposite to b', or by weights arranged to produce a centrifugal force couple equal and opposite to the moment of the force ab combined by lever arm aa' with the force a'b'.

In the structure which is illustrative of the principle of my invention, the non-revolving wobbling yoke corresponds to body D of Figures 7, 8, 9 and 10 with the single exception that a point on the yoke 70 (or body D) has been selected for making connection to the reciprocating member of the mechanism (by ball 89) so as to cause reciprocation in a path parallel with the principal axis of rotation (the A axis). The weight of the yoke (or body) adjacent to this point of connection is cut away to a sufficient degree to compensate for the weight of the reciprocating member (sickle 41) so that the yoke (or body) will still be in dynamic balance with the counterweights 80 and 81 (or E and E') on the principal shaft, providing the weight of the reciprocating member is considered to be concentrated on the yoke (or body) at said point of connection. This ideal condition of complete dynamic balance, may be approached in a greater or lesser degree, according to the expediences in a given commercial design.

In the design of the structure shown in detail in Figures 4 to 6, the moment of inertia of yoke 70, including weight 82, about the line 5—5 of Figure 4, is substantially less than its moment of inertia including reciprocating parts concentrated at ball 89, about a line through the center of shaft 40 and perpendicular to the line 5—5. Therefore, in order to obtain complete dynamic balance, the weight 82 of yoke 70 would have to be made substantially broader and thinner. Or perhaps preferably the weight might be divided into two parts that would be spaced apart from each other in order to increase the moment of inertia about line 5—5. After making the moment of inertia of the yoke in one direction equal to that in the other (reciprocating parts included) it would then also be necessary to proportion weights 80 and 81 large enough to produce a centrifugal force couple equal to and completely offsetting the inertia force couple of the wobbling yoke. The vibrating forces in the mechanism would then become substantially zero at all speeds, as long as the strength of parts is able to sustain the opposed forces.

An important feature herein is therefore the deliberate application of weight in a predetermined manner on a non-revolving, wobble yoke having a connecting element, in conjunction with certain weights fixed on a revolving element or shaft. Only such weight is applied on the wobbling yoke on that side of the yoke where connection is made with the reciprocating member, as is necessary for mechanical strength, and weight is provided in that part of the yoke which lies at the opposite side of the ball or equivalent pivotal connection.

An important design consideration in providing adequate strength to sustain the opposed forces in this mechanism when operating at high speed, is the selection of the type of bearing 71 shown in section in Figure 5. The reason is that the opposed force-couples above described are transmitted from weights 80 and 81 and hub 72 through bearing 71 to the yoke 70 or vice versa. The bearing here shown is commercially known as a double row ball bearing. Such bearings are, however, variously made with respect to the degree of tightness or looseness between the balls and races. The line of ball contact should be divergent at the inner race, as indicated by the angles Y and Y, and the bearing should be assembled in its manufactiure with a known degree of tightness, called a "preloaded" condition. Such a bearing has no looseness and has a maximum rigidity against any change in alinement between the inner and outer races. Indeed, this specification for a ball bearing is contrary to the usual requirement where a shaft member has two bearings, and where a certain ability of the races in either bearing to run in a misalined condition is desirable. In this novel combination, only a single bearing is used; and although this bearing has two rows of balls, the rigidity against alinement change is much greater than would be accounted for by the axial distance between the two rows of balls combined with the known capacity for radial load upon either of the ball rows. The capacity of this bearing against change in alinement is based rather upon the known thrust capacity, which is very high when angular ball contact is employed, and the nature of loading is such that thrust occurs in one direction upon a semi-circle of balls in one row, simultaneously with thrust in the opposite direction upon the opposed semi-circle of balls in the other row. The location of these thrust loads upon the outer race is but instantaneous, and actually revolves, even through the outer race itself does not revolve.

In Figures 11 to 13, are illustrated an application of this invention in the engine art. In the engine art, as well as for analogous purposes, it may be desirable to connect two pistons or reciprocating members by a single yoke.

In Figure 11, the numeral 95 indicates a suitable engine block having the cylinders 96, 97, with pistons 98, 99 operable therein. A suitable shaft is indicated at 100, held in suitable bearings 101 and 102. A fly-wheel is indicated at 103 and is keyed to shaft 100. The wheel is weighted as at 104, and the shaft is weighted as at 105, these weights functionally corresponding to weights 80, 81 of Figure 5, or weights E and E' of Figures 7 to 10. The connector or yoke is generally indicated at 110, and it has oppositely directed terminal portions 111, slidable in bearing blocks 112 of respective pistons. The yoke is mounted on a bearing 114, like bearing 71 of Figure 5, which bearing 114 is mounted on the hub 116 of a sleeve 117 which is mounted upon and surrounds the shaft 100. A ring 115 secures the outer part of the bearing in the yoke. A second sleeve 118 has an inner end engaging the inner ring of the bearing 114 and this sleeve 118 has a pinion 120 thereon. The sleeves are held against translation on the shaft, by engagement with the inner rings of the bearings 101 and 102.

The blocks 112, are pivotally held by means of studs 125, operating in sockets 126 of the block 112. These studs are threaded in the pistons and set screws 127 secure them, or they may be otherwise made adjustable in sockets 126. In the form illustrated each stud has a wrench socket.

The yoke 110, is weighted as at 130, see Figure 13, and the functional relations of these weights to the weights 104, 105 and to the other elements of this system are substantially the same as those of the first described form.

The preferred location of the two pivoted connections of the yoke with the pistons, when two cylindrical pivots are used, is diametrically on opposite sides of the yoke and on common pivotal axis which passes through the intersection of the inclined bearing axis with the axis of rotation of shaft 100. Two similar members, such as these pistons, connected in this manner are constrained to move with oppositely directed strokes, and yoke or wobble connector acting somewhat as a walking beam in relation to them. As herein shown a universal connection to one member or to each member may be provided, in such a manner as to eliminate any ball joints and yet permit wobbling motions of the type previously described.

In applying the fundamental principle of this invention, the weights 130, or their equivalents, must be added on the yoke in a location which is lateral to the line connecting the yoke to the reciprocating members, or pistons in order to make the moment of inertia of the yoke and weights, about the said line, equal to the amount of inertia of the yoke about a central line perpendicular thereto, when the reciprocating weights are considered to be concentrated at the respective points of connection. When these two moments of inertia are made equal and only then, the inertia force couples acting upon the wobbling yoke, including reciprocating members can be fully offset, and the system brought into dynamic balance by suitable weights on the revolving shaft which exert a centrifugal force couple substantially opposing and off-setting the inertia force couples that act in the yoke. This is analogous to the requirement for lateral width of the weight or weights on the yoke for obtaining dynamic balance when there is but a single reciprocating member.

Figure 11 illustrates somewhat diagrammatically the principle of this invention applied to an engine. The structure illustrated is obviously applicable to one single acting piston, or to two single acting pistons that lie on opposite sides of a principal shaft. It is equally applicable, as illustrated, to two double acting pistons, and when thus applied to internal combustion engines, would have four combustion chambers. When supplied with the usual valves, ignition devices, cooling means, etc. (not shown) the four combustion chambers cooperate with the respective piston faces to operate the engine on the principle of a four cylinder four cycle engine, in which suitable valve mechanism might be actuated by pinion 120. This is accomplished with a single inclined bearing and with but two pistons, without the usual multiplication of connecting rods and crank shaft throws. Moreover, the engine is dynamically balanced whereas the conventional four cylinder, four cycle engine is badly out of secondary balance.

I claim as my invention:

1. A device of the class described comprising, a rotative element, an element reciprocable in a direction substantially parallel with the rotative axis of said rotative element, a wobble member journaled on the rotative element, the axis of said wobble member being inclined to the axis of said rotative element, an operative connection between said wobble member and said reciprocable element, a weight on said wobble member at that side of the axis of the rotative element which is opposite said connection, said weight being located to counterbalance said reciprocable element and the connection, means fixed to the said weight means being arranged to produce a revolving dynamically unbalanced centrifugal couple, in opposition to the couple setup by motions of the wobble member and reciprocable element connected thereto.

2. In a mower, a drive shaft, a cutter bar reciprocable in a direction substantially parallel with the axis of the drive shaft and transversely to the direction of travel of the mower, a weighted member rotatable with the drive shaft and having a hub, a non-revolving wobble yoke having a bearing on said hub and being arranged to operate at an angle to the rotative axis of the shaft, means pivotally connecting the yoke with a cutter bar, a second weighted member at the opposite side of the yoke having its weight arranged at that side of the shaft which is opposite to the point of connection of the yoke with the cutter bar, said yoke being weighted also at that side, the weight of the first mentioned member being on that side nearest the point of connection of the yoke with the bar.

3. A mower having a frame and rolling means supporting the same, a cutter mechanism arranged forwardly of the rolling means including a transversely arranged reciprocating cutter, means for driving the cutter including weighty parts arranged at one side of the frame and cutter, a ground-engaging shoe underlying said parts and pivoted to the frame forwardly of said parts and being free to swing, and cushioning means acting to urge the shoe toward the ground and away from the frame.

4. A mower having a frame and rolling means supporting the same, a steering handle for the frame arranged rearwardly of said rolling means, a cutter mechanism arranged forwardly of the rolling means including a transversely reciprocable cutter bar which has a length substantially equal to the width of the frame, means for driving the cutter including parts which are arranged at one extreme side of the frame and adjacent and laterally beyond the end of the bar, a ground-engaging shoe underlying said parts and pivoted to the frame at a point forwardly of said bar and extending rearwardly of said bar and free to swing, and cushioning means acting to urge the shoe toward the ground and away from the frame.

5. A mower having a frame and rolling means supporting the same, a steering handle for the frame arranged rearwardly of said rolling means, a cutter mechanism arranged forwardly of the rolling means including a transversely reciprocable cutter bar which has a length substantially equal to the width of the frame, means for driving the cutter including parts which are arranged at one extreme side of the frame and adjacent and laterally beyond the end of the bar, a ground-engaging shoe underlying said parts and pivoted to the frame at a point forwardly of said bar and extending rearwardly of said bar, and free to swing, cushioning means acting to urge the shoe toward the ground and away from the frame, and a ground shoe underlying and supporting the opposite end of said cutter bar.

6. A device of the class described, comprising a rotative element, an element reciprocable in a direction substantially parallel with the rotative axis of said rotative element, a bearing having one element movable with the shaft, the center line of the bearing being inclined to the rotative axis of the shaft and substantially intersecting that axis, a wobble connector fixed to the other element of said bearing and means by which the connector is operably attached with the reciprocable element, said connector having its wobble axis perpendicular to the inclined axis of the bearing and intersecting the axes of said bearing and rotative element substantially at the center of gravity of the connector, means loading said connector to counterbalance the inertia of the reciprocating element, and means on said rotative element forming a dynamically unbalanced centrifugal couple adapted to offset and oppose the couple set up by the motions of the connector and reciprocable element.

7. A device of the class described, comprising a rotative shaft, an element reciprocable in a direction substantially parallel with the rotative axis of the shaft, a two-ring bearing surrounding the shaft, and having one ring movable with the shaft, the center line of the bearing being inclined to the rotative axis of the shaft and substantially intersecting that axis, a wobble connector fixed to the other ring, and means by which the connector is operably attached with the reciprocable element, said connector having its wobble axis perpendicular to the inclined axis of the bearing, and intersecting the bearing and shaft axes substantially at the center of gravity of the connector, means loading said connector to counterbalance the inertia of the reciprocating element, and means on said shaft forming a dynamically unbalanced centrifugal couple adapted to offset and oppose the couple set up by the motions of the connector and reciprocable elements.

8. In a mechanical system, a reciprocating member, a rotary shaft, and a motion transmitting linkage between the shaft and member comprising a wobble member journaled on the shaft upon an axis intersecting the shaft axis and means connecting the wobble member and reciprocating member, whereby either may be driven from the other, and means including non-revolving weights mounted on the wobble member and revolving weights mounted on the shaft for reducing the vibrations caused by the reciprocation of said member.

9. In a mechanical system, reciprocating means, a member mounted for universal oscillation about a center and connected to said means, a balancing weight on said member, a rotary shaft connected to said member so as to rotate when said member oscillates, and having its axis passing substantially through the center of oscillation of said member, and balance weights on said shaft, the balance weights on said shaft being proportioned for cooperation with the weight of said member so as to reduce the vibrations due to the reciprocation of said means.

10. In a mechanical system, a rotary shaft having an angularly disposed journal thereon, a wobble member mounted on said journal, a reciprocating member connected to one side of said wobble member, and a balance weight on the other side of said member from said journal.

11. In a mechanical system, a rotary shaft having an angularly disposed journal thereon, a wobble member mounted on said journal, a reciprocating member connected to one side of said wobble member, a balance weight on the other side of said member from said journal, and additional balance weights mounted on said shaft for cooperation with said wobble member balance weight.

12. In the mechanical system, a rotary shaft having an angularly disposed journal thereon, a reciprocating member, means including a wobble member mounted on said angularly disposed journal for transmitting motion between the shaft and the member, the journal connection with the wobble member being substantially at the center of gravity of said member and reciprocating member considered together.

13. A balanced mechanical linkage for transmitting power between rotary and reciprocating members, comprising a wobble member connected thereto, a bearing in said wobble member positioned so as to have the axis of the bearing through the center of gravity of the combined wobble member and reciprocating member considered together, a rotary shaft, a journal for said wobble member bearing carried by said shaft, the journal and shaft being positioned with respect to each other and with respect to the wobble member so that the journal axis substantially intersects the shaft axis at substantially the center of gravity of the wobble member, and at an angle of less than ninety degrees, and balance weights mounted on said shaft.

14. In a mowing machine, a reciprocating cutter bar, a member mounted for oscillation about a center and connected to the bar for reciprocating said bar, a balancing weight on said member, a rotary drive shaft for said member, having its axis passing substantially through the center of oscillation of said member, and balance weights on said shaft.

15. In a mowing machine, a reciprocating cutter bar, a member mounted for oscillation about a center and connected to the bar for reciprocating said bar, a balancing weight on said member, a rotary drive shaft for said member, having its axis passing substantially through the center of oscillation of said member, balance weights on said shaft, the balance weights of said shaft being proportioned for cooperation with the weight on said member so as to reduce the vibration due to the reciprocation of said cutter bar.

16. In a mowing machine, a rotary shaft having an angularly disposed journal thereon, a wobble member mounted on said journal, a reciprocating cutter bar connected to one side of said wobble member, a balance weight on the other side of said member from said journal, and additional balance weights mounted on said shaft for cooperation with said wobble member balance weight.

17. In a mowing machine, a rotary shaft having an angularly disposed journal thereon, a reciprocating cutter bar, means including a wobble member mounted on said angularly disposed journal for transmitting the motion thereof to the cutter bar, the journal connection with the wobble plate being substantially at the center of gravity of said plate and reciprocating cutter bar considered together.

18. In a mowing machine having a rotary drive element and a reciprocating cutter bar, a balanced mechanical linkage for transmitting motion substantially without vibration from said rotary element to the cutter bar comprising a wobble member connected to the reciprocating cutter bar, a bearing in said wobble member positioned at substantially the center of gravity of the wobble member and cutter bar considered together, and a journal for said wobble member bearing carried by the rotary drive element, the journal and shaft being positioned with respect to each other and with respect to the wobble member so that the journal axis substantially intersects the shaft axis substantially at the center of gravity of the wobble member and at an angle of less than ninety degrees.

19. In a mowing machine having a rotary drive element and a reciprocating cutter bar, a balanced mechanical linkage for transmitting motion substantially without vibration from said rotary element to the cutter bar, comprising a wobble member connected to the reciprocating cutter bar, a bearing in said wobble member positioned at substantially the center of gravity of the wobble member and cutter bar considered together, a journal for said wobble member bearing carried by the rotary drive element, the journal and shaft being positioned with respect to each other and with respect to the wobble member so that the journal axis substantially intersects the shaft axis substantially at the center of gravity of the wobble member and at an angle of less than ninety degrees, and balance weights mounted on said shaft.

20. In a mowing machine having a rotary drive element and a reciprocating cutter bar, a balanced mechanical linkage for transmitting motion substantially without vibration from said rotary element to the cutter bar, comprising a wobble member connected to the reciprocating cutter bar, a bearing in said wobble member positioned at substantially the center of gravity of the wobble member and cutter bar considered together, a journal for said wobble member bearing carried by the rotary drive element, the journal and shaft being positioned with respect to each other and with respect to the wobble member so that the journal axis substantially intersects the shaft axis substantially at the center of gravity of the wobble member and at an angle of less than ninety degrees, and balance weights mounted on said shaft, the centrifugal couple of said balance weights being substantially equal to the inertia couple of said wobble member and cutter bar considered together.

21. A rotary shaft, weights thereon positioned to produce a centrifugal couple, a wobble member actuated by said shaft, a reciprocating member connected to said wobble member, weight on said wobble member so disposed that the inertia of said wobble member and said reciprocating member considered together produces an inertia couple acting in a plane, other weight on said wobble member disposed substantially at right angles to said plane and producing an inertia couple, the phase angle of the weights on said shaft being such as to oppose the centrifugal couple thereof to said inertia couples.

22. A rotary shaft, weights thereon positioned to produce a centrifugal couple, a wobble member actuated by said shaft, a reciprocating member connected to said wobble member, weight on said wobble member so disposed that the inertia of said wobble member and said reciprocating member considered together produces an inertia couple acting in a plane, other weight on said wobble member disposed substantially at right angles to said plane and producing an inertia couple, the amount and position of the rotary shaft weights being such as substantially balance the said inertia couples.

AMOS F. MOYER.